United States Patent
Gruhn et al.

(10) Patent No.: US 12,427,934 B2
(45) Date of Patent: Sep. 30, 2025

(54) PRESSED CARRIER WITH PARTIAL BACKLIGHTING

(71) Applicant: Bayerische Motoren Werke Aktiengesellschaft, Munich (DE)

(72) Inventors: Philipp Gruhn, Munich (DE); Renate Korn, Munich (DE); Marlies Michel, Oberschleissheim (DE); Bernhard Schmid, Hallbergmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 569 days.

(21) Appl. No.: 17/321,621

(22) Filed: May 17, 2021

(65) Prior Publication Data
US 2021/0354639 A1 Nov. 18, 2021

(30) Foreign Application Priority Data
May 18, 2020 (DE) ...................... 10 2020 113 334.0

(51) Int. Cl.
*B60R 13/02* (2006.01)
*B60Q 3/54* (2017.01)

(52) U.S. Cl.
CPC ................ *B60R 13/02* (2013.01); *B60Q 3/54* (2017.02)

(58) Field of Classification Search
CPC .............................. B60Q 3/54; B60Q 2500/10
See application file for complete search history.

(56) References Cited

U.S. PATENT DOCUMENTS

| 7,387,397 B2* | 6/2008 | Konet ..................... G09F 13/04 362/604 |
| 10,672,327 B1* | 6/2020 | Hinchman ............... B60Q 3/14 |
| 10,967,786 B1* | 4/2021 | Richardson ............ B32B 5/024 |

(Continued)

FOREIGN PATENT DOCUMENTS

| CN | 108790314 A * 11/2018 ....... B29C 45/14811 |
| DE | 10 2010 043 960 A1 5/2012 |

(Continued)

OTHER PUBLICATIONS

German-language Office Action issued in German Application No. 10 2020 113 334.0 dated Mar. 22, 2021 with partial English translation (13 pages).

*Primary Examiner* — Colin J Cattanach
(74) *Attorney, Agent, or Firm* — Crowell & Moring LLP

(57) ABSTRACT

A molded part, in particular to an interior trim part of a motor vehicle, consists of a pressed carrier, formed from a fiber-plastic composite, a carrier structure made of a plastic for fixedly arranging the molded part on a motor vehicle, and a light source. The carrier structure is molded with an injection molding method to a surface of a rear side of the pressed carrier such that the carrier structure lies flat directly against the surface, in particular the entire surface, of the rear side of the pressed carrier. The pressed carrier is at least translucent, and the carrier structure is opaque. The carrier structure has at least one cutout, which forms a through opening to the surface of the pressed carrier. The light source is arranged for backlighting purposes on the rear side of the pressed carrier such that, with appropriate use, light is visible on a viewing side of the pressed carrier.

11 Claims, 2 Drawing Sheets

(56) References Cited

U.S. PATENT DOCUMENTS

| | | | | |
|---|---|---|---|---|
| 2006/0176710 | A1* | 8/2006 | Meinke | B60R 13/04 |
| | | | | 362/503 |
| 2009/0257241 | A1* | 10/2009 | Meinke | B60R 13/005 |
| | | | | 362/546 |
| 2011/0057465 | A1* | 3/2011 | Beau | B60K 37/00 |
| | | | | 296/1.08 |
| 2013/0301287 | A1 | 11/2013 | Schlemmer | |
| 2015/0307033 | A1* | 10/2015 | Preisler | B60Q 3/20 |
| | | | | 296/1.08 |
| 2017/0291536 | A1* | 10/2017 | Cannon | B32B 7/12 |
| 2021/0107400 | A1* | 4/2021 | Erler | B60Q 3/16 |
| 2021/0229599 | A1* | 7/2021 | DeGrote | B60Q 3/54 |
| 2021/0300006 | A1* | 9/2021 | Piccin | B32B 5/02 |
| 2021/0300265 | A1* | 9/2021 | Piccin | B60K 37/02 |
| 2022/0024378 | A1* | 1/2022 | Yang | G06F 3/03547 |

FOREIGN PATENT DOCUMENTS

| | | | | |
|---|---|---|---|---|
| DE | 10 2012 111 187 A1 | | 5/2014 | |
| DE | 10 2012 024 294 A1 | | 6/2014 | |
| DE | 102013004002 A1 | * | 9/2014 | ............ B60Q 3/004 |
| DE | 10 2013 020 647 A1 | | 6/2015 | |
| DE | 102018214838 A1 | * | 3/2020 | |
| DE | 102018124893 A1 | * | 4/2020 | |
| WO | WO-2010080967 A1 | * | 7/2010 | ............ B32B 27/12 |
| WO | WO-2018013557 A1 | * | 1/2018 | ........... B32B 27/065 |

\* cited by examiner

PRESSED CARRIER WITH PARTIAL BACKLIGHTING

CROSS REFERENCE TO RELATED APPLICATION

This application claims priority under 35 U.S.C. § 119 from German Patent Application No. 10 2020 113 334.0, filed May 18, 2020, the entire disclosure of which is herein expressly incorporated by reference.

BACKGROUND AND SUMMARY OF THE INVENTION

The invention relates to a molded part, in particular to an interior trim part of a motor vehicle, consisting of a pressed carrier, formed from a fiber-plastic composite, of a carrier structure made of a plastic for fixedly arranging the molded part on a motor vehicle, and of a light source.

Molded parts for an interior of a motor vehicle are typically decorative parts or a pure design element in the vehicle interior, for example having a wood veneer appearance or an aluminum appearance on the viewing side facing the passenger compartment. In the course of the functionalization and individualization of the vehicle interior, molded parts are provided for example with light effects for bringing out symbols or cutouts in order to visually upgrade them. A lighting event without any visible light guide, however, has so far been very complicated to produce, since a graphic or lettering is produced via a printed layer or a special intermediate layer. Symbols are in part projected from the rear side onto layers of the molded part by means of corresponding illumination, wherein the symbols thus illustrated often appear blurred and without clear delimitation, which means they are difficult to make out and to read.

Furthermore, further solutions are known, in which operating and display functionalities are integrated into molded parts or vehicle molded parts. In a non-used or switched-off state, the graphic or the lettering is usually visible, with the result that the visual appearance of the interior trim part is disrupted and the design is negatively impacted.

It is therefore the object of the present invention to provide a molded part, in particular an interior trim part of a motor vehicle, on whose viewing side display functions or a graphic or lettering is presentable and which has a visually non-disrupted appearance when the display function is deactivated or not in use.

The invention proposes a molded part, in particular an interior trim part of a motor vehicle, comprising a pressed carrier, formed from a fiber-plastic composite, of a carrier structure made of a plastic for fixedly arranging the molded part on a motor vehicle, and of a light source. The carrier structure is here molded with an injection molding method to a surface of a rear side of the pressed carrier such that the carrier structure lies flat directly against the surface, in particular the entire surface, of the rear side of the pressed carrier. The pressed carrier is furthermore at least translucent, and the carrier structure is opaque. The carrier structure furthermore has at least one cut-out, which forms a through opening to the surface of the pressed carrier. Moreover, the light source for backlighting purposes is arranged on the rear side of the pressed carrier such that, with appropriate use, light is visible on a viewing side of the pressed carrier. The advantage here is that, without further components, a backlit pressed interior trim part is provided, in which the partial screening function is produced by means of the typically already existing back molding. In this way, a lighting event can be realized with, for example, an LED light source, without a visible light guide.

Provision is made in an advantageous embodiment variant for the at least one cutout of the carrier structure to be formed on the surface of the pressed carrier in the form of a symbol. Furthermore, provision is made according to the invention in a further advantageous variant for the carrier structure to have a multiplicity of cutouts and for the cutouts on the surface of the pressed carrier to form lettering or a graphic. In this way, the viewing side of the molded part is able to be designed as desired and individually, with the result that the molded part or in particular the interior trim part is adaptable to corresponding specifications or customer wishes.

The molded part is preferably formed such that the carrier structure is a stiffening structure for the pressed carrier. It is expedient here that there are more functions of the molded part or interior trim part, since, in addition to the design functions, the function of stiffening of the molded part or of the interior trim part is also covered.

In one exemplary embodiment of the invention, provision is made for the pressed carrier to comprise a translucent or transparent upper layer on a surface on the viewing side. The upper layer is a textile material, an imitation leather, a perforated leather, or a lacquer. The advantage of this is that the design of the viewing side of the molded part is further variable by means of the upper layer and the backlighting or the light that is visible of the back-lighting on the viewing side of the molded part is able to be influenced.

In a preferred embodiment of the present molded part, provision is made for the carrier structure of the pressed carrier and the at least one cutout of the carrier structure to be producible in a common production step of the injection molding method. In this way, the molded part or interior trim part can be produced off-tool or without further production steps in this production step without any additional outlay.

The molded part according to the invention is formed in one embodiment variant such that the pressed carrier is translucent in a manner such that the at least one cutout is visible from the viewing side of the pressed carrier in a state in which the light source provides backlighting for the pressed carrier and is not visible in a state in which the light source does not provide back-lighting for the pressed carrier. In this way, a visually non-disrupted appearance is ensured when the display function is deactivated or not used.

In an alternative embodiment of the present molded part, provision is furthermore made for the fiber-plastic composite of the pressed carrier to be formed by means of natural fibers, fibers of flax, fibers of hemp, recycling fibers, polyester fibers, PET fibers, thermoset fibers, pressed PE(S) fibers, and/or mixed fibers. These materials are particularly suitable for a fiber-plastic composite component that is intended to have translucent properties.

Moreover, an embodiment variant in which the pressed carrier is transparent is expedient. It is expedient because, in some applications, it is necessary or desired for the components behind the surface to be visible from the viewing side.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
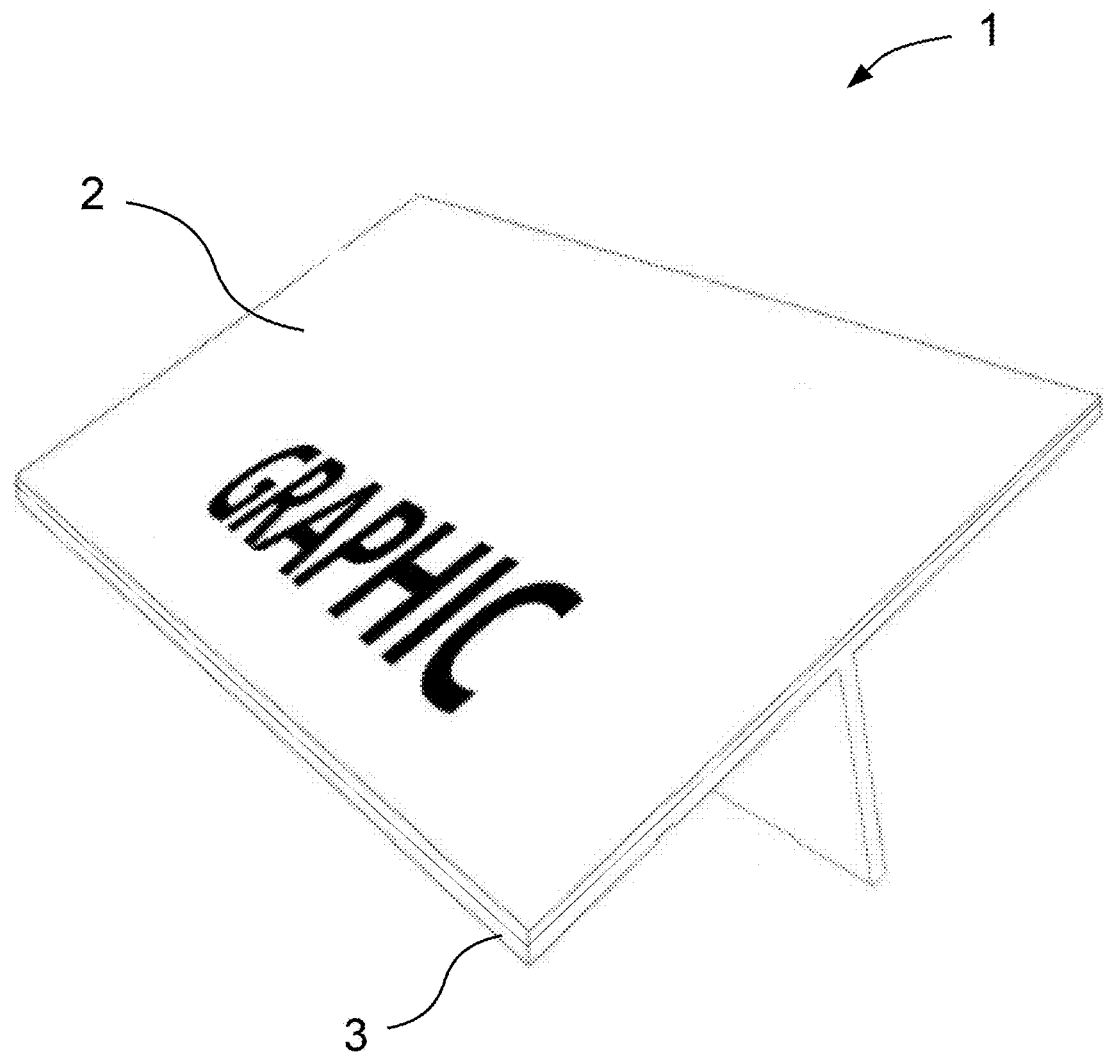
FIG. 1 is a perspective view of a molded part, formed of a pressed carrier, a carrier structure, and a light source.

FIG. 1 illustrates a perspective view of a molded part 1, formed of a pressed carrier 2, a carrier structure 3, and a light source 5. The pressed carrier 2 is formed from a translucent fiber-plastic composite, which is formed by means of mixed fibers of natural fibers and polyester fibers. Furthermore, the pressed carrier 2 has, on a surface on the viewing side, a translucent upper layer made of a textile material.

The pressed carrier 2 is rectangular and plate-shaped, and a carrier structure 3 is molded with an injection molding method to a surface of a rear side of the pressed carrier 2 such that the carrier structure 3 lies flat directly against the entire surface of the rear side of the pressed carrier 2. Moreover, the carrier structure 3 is formed from an opaque plastic and for the purpose of fixedly arranging the molded part 1 on a motor vehicle. The carrier structure 3 is here a stiffening structure for the pressed carrier 2.

The carrier structure 3 has the shape of a T-carrier, which divides a rear side of the pressed carrier 2 into two regions having, in each case, one light source 5, which are not illustrated or are obscured in FIG. 1.

The carrier structure 3 has a multiplicity of cutouts 4, which form in each case lettering with the word "GRAPHIC" on the surface of the pressed carrier 2 in both regions of the rear side. The carrier structure 3 of the pressed carrier 2 and the respective cutouts 4 of the carrier structure 3 are produced in a common production step of an injection molding method.

One of the two light sources 5 is in a switched-on state, and the other is in a switched-off state. The light source 5 is here arranged in each case for back-lighting purposes on the rear side of the pressed carrier 2 such that, with appropriate use, light is visible on a viewing side of the pressed carrier 2. Since the pressed carrier 2 is translucent such that the cutouts 4 are visible from the viewing side of the pressed carrier 2 in the state in which the light source provides backlighting for the pressed carrier 2, one region shows the lettering "GRAPHIC". In the other region, the light source does not provide backlighting to the pressed carrier 2, and consequently the lettering is not visible either.

Figure 2:
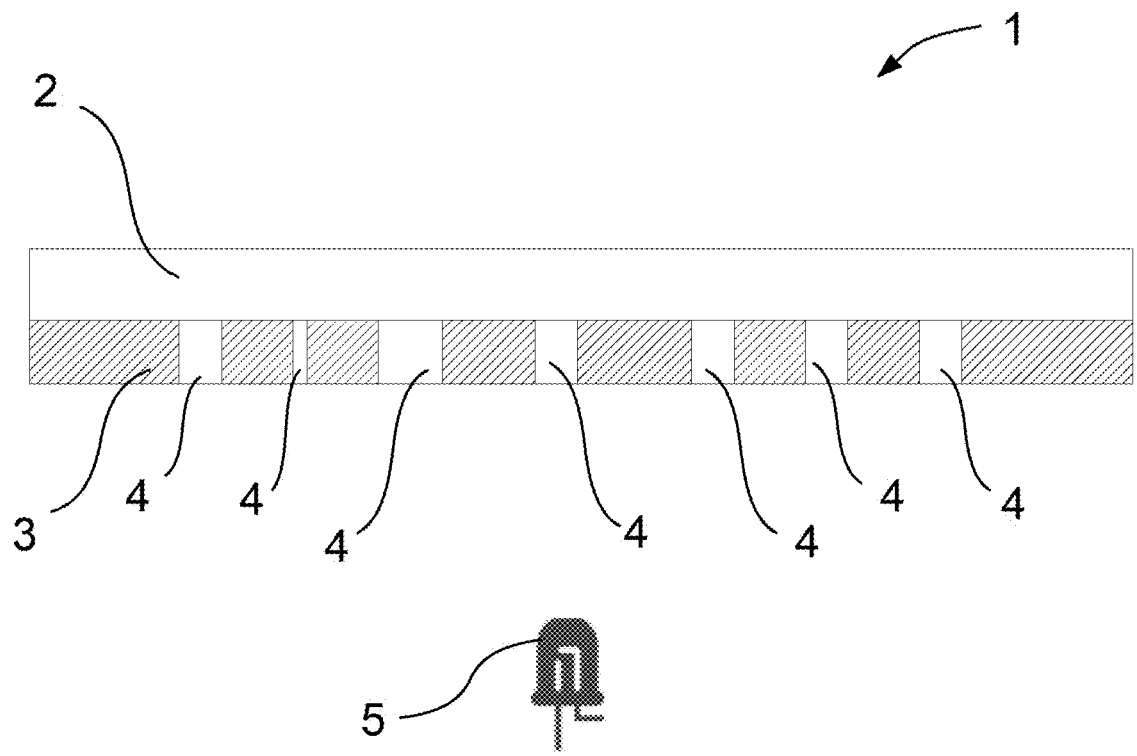
FIG. 2 is a sectional view of the molded part, formed of a pressed carrier, a carrier structure, and a light source.

FIG. 2 shows a sectional view of the molded part 1, illustrated in FIG. 1, consisting of the pressed carrier 2, the carrier structure 3, and the light source 5. The carrier structure 3 has seven cutouts 4, which each form a through opening to the surface of the pressed carrier 2 and as a result of which the lettering with the word "GRAPHIC" is formed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A molded part of a motor vehicle, comprising:
a pressed carrier formed from a fiber-plastic composite;
a carrier structure made of a plastic for fixedly arranging the molded part on the motor vehicle; and
a light source,
wherein the carrier structure is molded with an injection molding method to a surface of a rear side of the pressed carrier such that the carrier structure lies flat directly against the surface of the rear side of the pressed carrier,
wherein the pressed carrier is at least translucent, and the carrier structure is opaque,
wherein the carrier structure has at least one cutout, which forms a through opening to the surface of the pressed carrier,
wherein the light source is arranged for backlighting on the rear side of the pressed carrier such that, when providing backlighting, light is visible on a viewing side of the pressed carrier, and
wherein the fiber-plastic composite is formed via mixed fibers of natural fibers and plastic fibers.

2. The molded part according to claim 1, wherein the at least one cutout of the carrier structure is formed on the surface of the pressed carrier as a symbol or a character.

3. The molded part according to claim 2, wherein the carrier structure has a multiplicity of cutouts, and wherein the cutouts on the surface of the pressed carrier form lettering or a graphic.

4. The molded part according to claim 1, wherein the carrier structure is a stiffening structure for the pressed carrier.

5. The molded part according to claim 1, wherein the pressed carrier comprises a translucent or transparent upper layer on a surface on the viewing side, and an upper layer on the pressed carrier is a textile material, an imitation leather, a perforated leather, or a lacquer.

6. The molded part according to claim 2, wherein the carrier structure of the pressed carrier and the at least one cutout of the carrier structure are producible in a common production step of the injection molding method.

7. The molded part according to claim 2, wherein the pressed carrier is translucent in a manner such that the at least one cutout is visible from the viewing side of the pressed carrier in a state in which the light source provides backlighting for the pressed carrier and is not visible in a state in which the light source does not provide backlighting for the pressed carrier.

8. The molded part according to claim 1, wherein the plastic fibers comprise polyester fibers.

9. The molded part according to claim 1, wherein the pressed carrier is transparent.

10. The molded part according to claim 1, wherein the carrier structure lies flat directly against the entire surface of the rear side of the pressed carrier.

11. The molded part according to claim 1, wherein the molded part is an interior trim part of the motor vehicle.

* * * * *